(12) United States Patent
Pingston et al.

(10) Patent No.: US 10,166,940 B2
(45) Date of Patent: Jan. 1, 2019

(54) EXTENDABLE VEHICLE GRILLE

(71) Applicant: Ford Global Technologies, LLC, Dearborn, MI (US)

(72) Inventors: Stephen Noel Pingston, Royal Oak, MI (US); Sudip Sankar Bhattacharjee, Novi, MI (US); Mustafa Ahmed, Canton, MI (US); Harsha Kusnoorkar, Canton, MI (US); Bhujanga Kumar Adapa, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 12 days.

(21) Appl. No.: 15/350,433

(22) Filed: Nov. 14, 2016

(65) Prior Publication Data

US 2018/0134247 A1 May 17, 2018

(51) Int. Cl.
*B60R 19/40* (2006.01)
*B60R 19/52* (2006.01)
(Continued)

(52) U.S. Cl.
CPC .............. *B60R 19/40* (2013.01); *B60R 19/52* (2013.01); *B60R 21/0134* (2013.01); *B60R 2019/525* (2013.01); *B60R 2021/01013* (2013.01); *B60R 2021/01252* (2013.01); *B60R 2021/01286* (2013.01); *B60Y 2400/40* (2013.01); *B60Y 2400/406* (2013.01); *B60Y 2400/408* (2013.01);
(Continued)

(58) Field of Classification Search
CPC ....... B60R 21/34; B60R 21/01; B60R 19/023; B60R 19/40; B60R 19/52; B60R 19/02; B60R 2021/01286; B60R 2019/525; B60R 2021/01013; B60R 2021/0051; B60R 2021/0004; B60R 2021/01252; B60Y 2400/408; B60Y 2400/41; B60Y 2400/406; B60Y 2400/40; B60Y 2400/412

See application file for complete search history.

(56) References Cited

U.S. PATENT DOCUMENTS 6,685,243 B1 * 2/2004 Evans ................... B60R 19/18
293/102
7,192,079 B2 3/2007 Schramm et al.
(Continued)

FOREIGN PATENT DOCUMENTS

DE 102014008901 A1 12/2015
GB 2394920 A 5/2004
(Continued)

OTHER PUBLICATIONS

UK Search Report dated Apr. 13, 2018 re GB Appl. 1718572.9.
(Continued)

*Primary Examiner* — Frederick M Brushaber
(74) *Attorney, Agent, or Firm* — Frank A. MacKenzie; Bejin Bieneman PLC

(57) ABSTRACT

A vehicle comprising a base, a grille and a bumper. The grille is supported by the base, and is movable between a retracted position and an extended position. The bumper is supported by the base below the grille. In the retracted position a front terminal portion of the grille is offset from a front terminal portion of the bumper, and in the extended position the front terminal portion of the grille is generally aligned with the front terminal portion of the bumper.

20 Claims, 7 Drawing Sheets

(51) Int. Cl.
    *B60R 21/0134*      (2006.01)
    *B60R 21/01*      (2006.01)

(52) U.S. Cl.
    CPC ..... *B60Y 2400/41* (2013.01); *B60Y 2400/412* (2013.01)

(56) References Cited

U.S. PATENT DOCUMENTS

| | | | |
|---|---|---|---|
| 8,950,800 B1 | 2/2015 | Farooq et al. | |
| 9,250,803 B2 | 2/2016 | Abate | |
| 9,315,168 B2* | 4/2016 | Pugh-Jones | B60R 19/52 |
| 2005/0212327 A1* | 9/2005 | Schramm | B60R 19/52 |
| | | | 296/187.04 |
| 2009/0242308 A1* | 10/2009 | Kitte | B60R 21/36 |
| | | | 180/271 |
| 2012/0019025 A1* | 1/2012 | Evans | B60K 11/085 |
| | | | 296/193.1 |
| 2013/0092463 A1* | 4/2013 | Hori | B60K 11/085 |
| | | | 180/68.1 |
| 2014/0175815 A1* | 6/2014 | Kim | B60R 19/52 |
| | | | 293/115 |
| 2015/0091328 A1* | 4/2015 | Pugh-Jones | B60R 19/52 |
| | | | 296/187.04 |
| 2015/0136513 A1* | 5/2015 | Rao | B60R 21/38 |
| | | | 180/274 |
| 2015/0367812 A1 | 12/2015 | Cha et al. | |

FOREIGN PATENT DOCUMENTS

| | | |
|---|---|---|
| GB | 2394920 A1 | 5/2004 |
| JP | 2006264495 A | 10/2006 |
| JP | 2007320530 A | 12/2007 |
| WO | 2015171776 A1 | 11/2015 |
| WO | 2016014151 A1 | 1/2016 |
| WO | 2016037090 A1 | 3/2016 |

OTHER PUBLICATIONS

Fagnant et al., "Dynamic ride-sharing and fleet sizing for a system of shared autonomous vehicles in Austin, Texas", Transportation, Springer Science + Business Media, New York, published online Aug. 22, 2016.
Zhang et al., "Effective and Efficient: Large-Scale Dynamic City Express", IEEE Transactions on Knowledge and Data Engineering, vol. 28, No. 12, Dec. 2016.
UK Search Report dated May 4, 2018 re GB Appl. No. 1718410.2.

* cited by examiner

EXTENDABLE VEHICLE GRILLE

BACKGROUND

The shape and dimensions of a front profile of a vehicle may affect the interaction with a pedestrian during a collision between the vehicle and the pedestrian. For example, the shape and dimensions of a front bumper may affect the interaction with a knee of the pedestrian. Accordingly, several national and multi-national vehicle safety regulatory bodies have formulated pedestrian safety standards which new vehicles are measured against.

DETAILED DESCRIPTION

Figure 1:
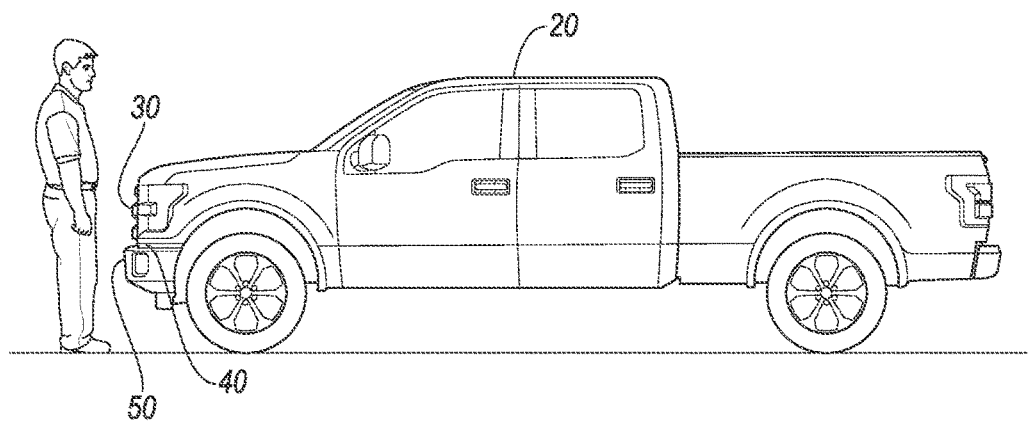
FIG. 1 illustrates a side view of a vehicle with a movable grille.
Figure 2:
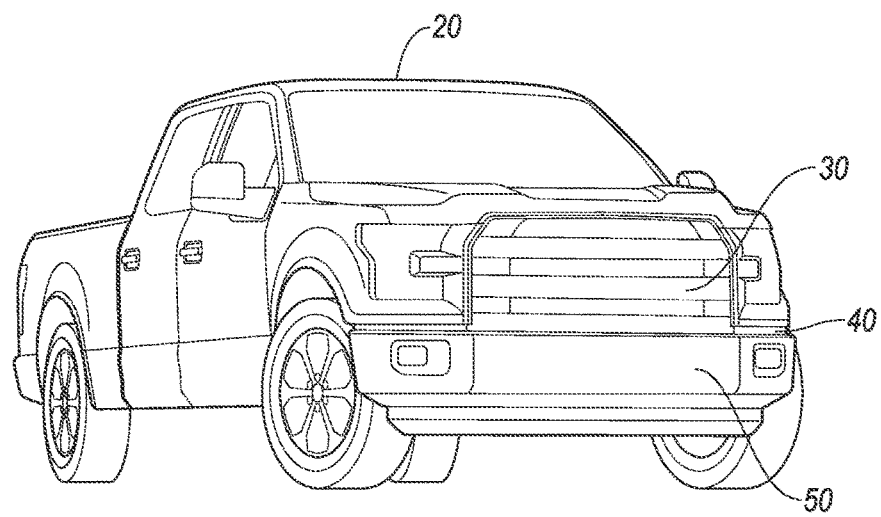
FIG. 2 illustrates a perspective view of the vehicle of FIG. 1.
Figure 3:
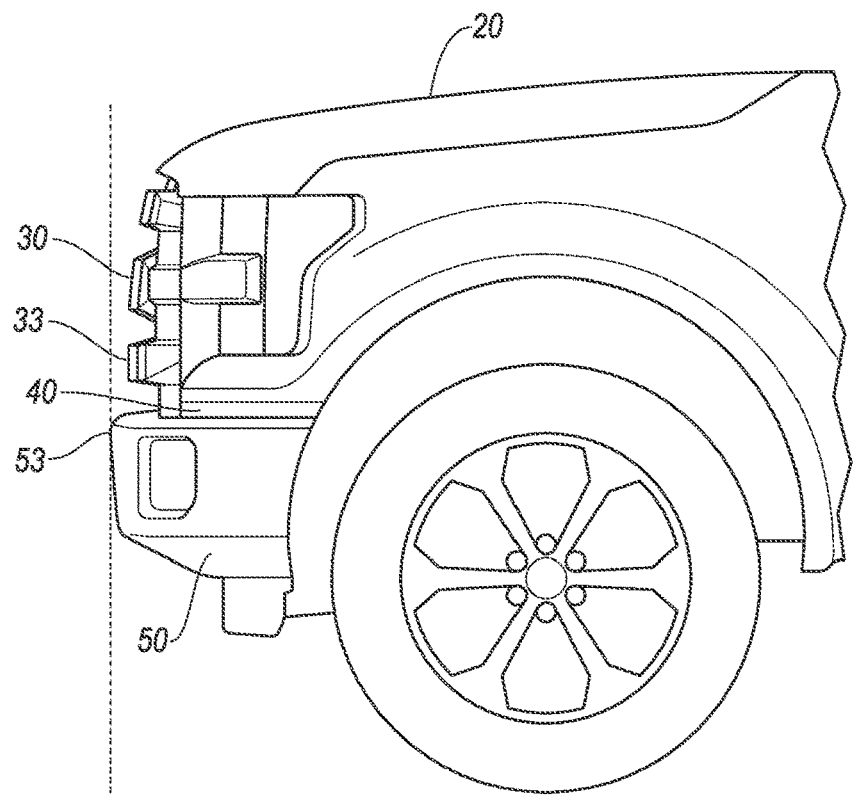
FIG. 3 illustrates a side view of a front section of the vehicle of FIG. 1 with the movable grille in a retracted position.
Figure 4:
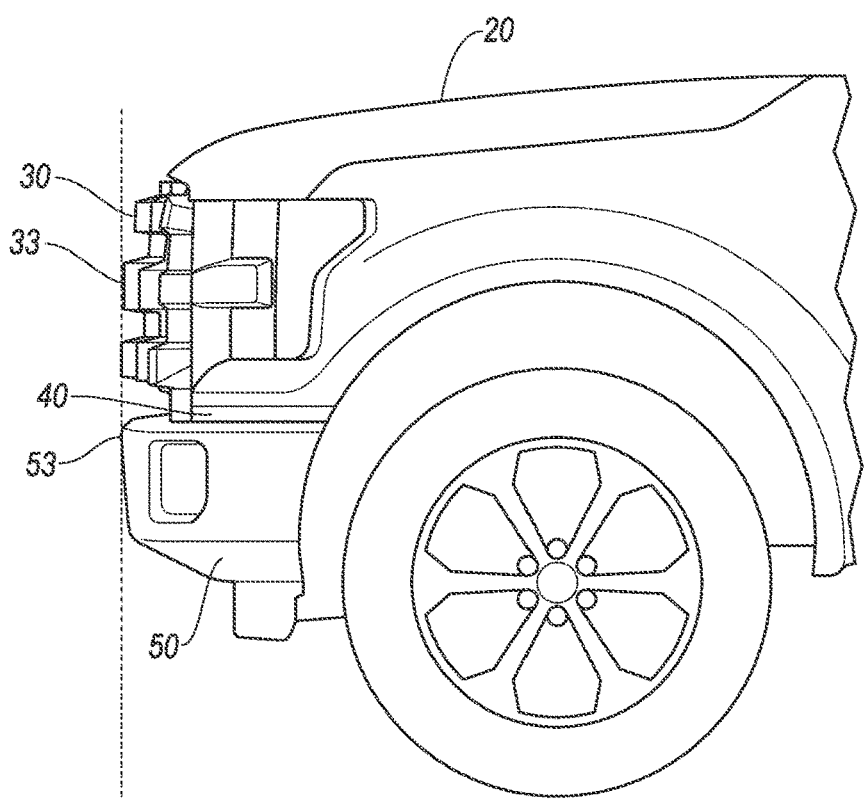
FIG. 4 illustrates a side view of the front section of the vehicle of FIG. 1 with the movable grille in an extended position.

With reference to the Figures, wherein like numerals indicate like parts throughout the several views, a vehicle 20 having a moveable grille 30 is generally shown. The grille 30 is supported by a base 40, and moves between a retracted position, as shown in FIG. 3, and an extended position, as shown in FIG. 4. A bumper 50 is supported by the base 40 below the grille 30. In the extended position, a front portion 33 of the grille 30 is generally aligned with a front portion 53 of the bumper 50. In the retracted position the front portion 33 of the grille 30 is offset from the front portion 53 of the bumper 50.

The movable grille 30 may be part of an assembly 25 for use with the vehicle 20. The assembly 25 includes the grille 30 supported by the base 40.

A computer 60 may control movement of the grille 30. The computer 60 is programmed with instructions to determine a speed of the vehicle 30. Upon determination that the speed of the vehicle 30 is above a threshold speed, the computer 60 causes the grille 30 to move to the extended position.

The assembly 25 includes linear actuator 70 disposed between, and supported by, the grille 30 and the base 40. The linear actuator 70 may be controlled by the computer 30. Actuation of the linear actuator 70 causes the grille 30 to move between the retracted position and the extended position.

In the following description, relative orientations and direction (by way of example, top bottom, forward, rearward, front, back, outboard, inboard, inward, outward, lateral, left, right) are from the perspective of an occupant seated in a driver seat, facing a dashboard of a vehicle. Orientation and direction relative to the apparatus are given related to when the apparatus is supported by the vehicle as described below and shown in the figures.

With reference to FIGS. 1-10, the grille 30. The grille 30 provides a protective and esthetically pleasing cover for an air intake of the vehicle 20. For example, the grille 30 may cover a radiator of the vehicle 20 and allows airflow to the radiator. The grille 30 includes a front terminal portion 33, i.e., a portion of the grille 30 that is first to contact an object, such as a pedestrian, in a frontal collision. The grille 30 is supported by the base 40. For example, the grille 30 may be supported by the base 40 via the linear actuator 70, a hinge 80 (discussed below), and/or by other support structures which provide support and relative movement between two objects, such as known track and roller assemblies, tongue and groove slider assemblies, etc.

The grille 30 may include a top end 35 and an opposing a bottom end 37. The top end 35 may also be referred to as a first end 35, and the bottom end 37 may also be referred to as a second end 37. The first end 35 of the grille 30 is opposite the second end 37 such that when the grille 30 is installed on the vehicle 20, the first end 35 is on the top of the grille 30, and the second end 37 is on the bottom of the grille 30.

The base 40 supports the grille 30. The base 40 may be a structure that secures to the vehicle 20, such as a plate or frame, or the base 40 may be part the vehicle 20 itself, such as part of a vehicle body, a vehicle frame, a vehicle subframe, etc. When the base 40 is formed from the vehicle 20 itself, or when the base 40 is installed onto the vehicle 20, the base 40 may support the grille 30 in a location above the bumper 50.

The bumper 50 is attached or integrated to the front of the vehicle 20 to absorb impact in a collision. The bumper 50 extends in a latitudinal direction from a right side of the vehicle 20 to a left side of the vehicle 20. The bumper 50 may be supported by the base 40 under the grille 30. The bumper 50 includes a front portion 53, i.e. the portion of the bumper 50 that is first to contact an object, such as a pedestrian, in a frontal collision.

Figure 11:
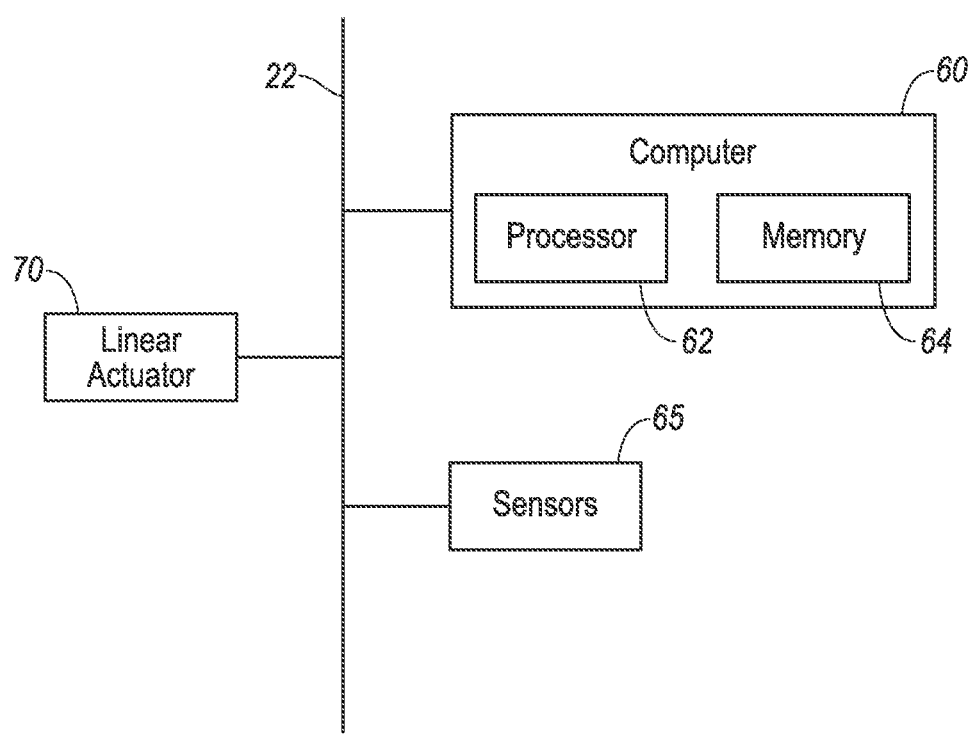
FIG. 11 is a block diagram of components of an example moveable grille.

As shown in FIG. 11, the computer 60 is a computing device that includes a processor 62 and a memory 64.

The processor 62 is implemented via circuits, chips, or other electronic components and may include one or more microcontrollers, one or more field programmable gate arrays (FPGAs), one or more application specific circuits (ASICs), one or more digital signal processors (DSPs), one or more customer integrated circuits, etc. The processor 62 is programmable to process the data and communications received via the memory 64, sensors 65, and the linear actuator 70. Processing the data and communications may include processing to determine a speed of the vehicle 20, and to actuate the linear actuator 70 to move the grille 30 between the extended and retracted positions based at least on the determined speed. As described below, the processor 62 instructs vehicle 20 components to actuate based on the sensor data.

The memory 64 is implemented via circuits, chips or other electronic components and can include one or more of read only memory (ROM), random access memory (RAM), flash memory, electrically programmable memory (EPROM), electrically programmable and erasable memory (EEPROM), embedded Multimedia Card (eMMC), a hard drive, or any volatile or non-volatile media etc. The memory 64 may store instructions for performing the processes described herein, and data collected from sensors and communications.

The computer 60 is in electronic communication with one or more conventional and known (and therefore not shown in the drawings) input devices for providing data to the computer 30 and one or more output devices for receiving data and/or instructions from the computer 60 e.g., to actuate an output device. Exemplary input devices include: human machine interfaces (HMIs) such as a switch or graphical user interface (GUI); imaging devices such as LiDAR, still and/or video cameras, infrared sensors, the sensors 65 etc., as well as other sensors and/or electronic control units (ECUs) that are known to provide data, e.g., on a vehicle communications bus or network 22, such as, radar, ultra-sonic sensors, accelerometers, gyroscopes, pressure sensors, thermometers, barometers, altimeters, current sensing devices, voltage sensing devices, microphones, light sensors, etc. etc. Exemplary output devices that may be actuated by the computer 60 include: warning light and audible subsystems; HMIs, the linear actuator 70, etc.

The sensors 65 collect and send data to the computer 60. The sensors 65 may detect internal states of the vehicle 20, for example, wheel speed, wheel orientation, and engine and transmission variables. The sensors 65 may detect the position or orientation of the vehicle 20, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 65 may detect the external world, for example, light measurement sensors, photometers, wind speed measurement sensors, radar sensors, scanning laser range finders, light detection and ranging (LIDAR) devices, and image processing sensors such as cameras.

The linear actuator 70 creates motion in a straight line. The linear actuator may be a mechanical actuator, a hydraulic actuator, a pneumatic actuator, a piezoelectric actuator, and/or an electromechanical actuator.

The linear actuator 70, more specifically, may be a mechanical actuator that converts rotary motion of a control knob, handle, or electric motor into linear displacement via screws and/or gears. The mechanical actuator may be a wheel and axle type where a rotating wheel on an axle moves a cable, rack, chain or belt to produce linear motion. Exemplary wheel and axle mechanical actuators include hoists, winches, rack and pinions, chain drives, belt drives, etc. Mechanical actuators also include screw types where rotating a nut of the actuator causes a screw shaft of the actuator to move in a straight line, and vice-versa. Exemplary screw type actuators include leadscrews, screw jacks, ball screws, and roller screws.

As another example, the linear actuator 70 may be a hydraulic actuator having a piston disposed within a hollow cylinder filled with an incompressible fluid. An unbalanced pressure applied to the fluid at a top and/or bottom of the piston generates force that can move piston. The hydraulic actuator may be controlled by a hydraulic pump. As another example, the linear actuator 70 may be a pneumatic actuator that operates by using compressed gas to generate force.

With reference to FIGS. 5-8, the linear actuator may include a rack 72 and a pinion 74.

The rack 72 includes teeth and the pinion 74 engages the teeth such that rotational movement of the pinion 74 causes linear movement of the rack 72. For example, rotation of the pinion 74 may be provided by a motor 75 supported by the base 40. The motor 75 has a shaft directly engaged with the pinion 74. Alternatively, a reduction gear may be disposed between the motor 75 and the pinion 74.

Rotation of the pinion 74 in one direction causes the rack 72 to move in a forward direction, pushing the grille 30 to the extended position. Rotation of the pinion 74 in an opposite direction causes the rack 72 to move in a rearward direction, pulling the grille 30 to the retracted position. The computer 60 may communicate instructions to the motor 75 by, for example, a vehicle communication bus or network 22 (as shown in FIG. 11).

Figure 6:
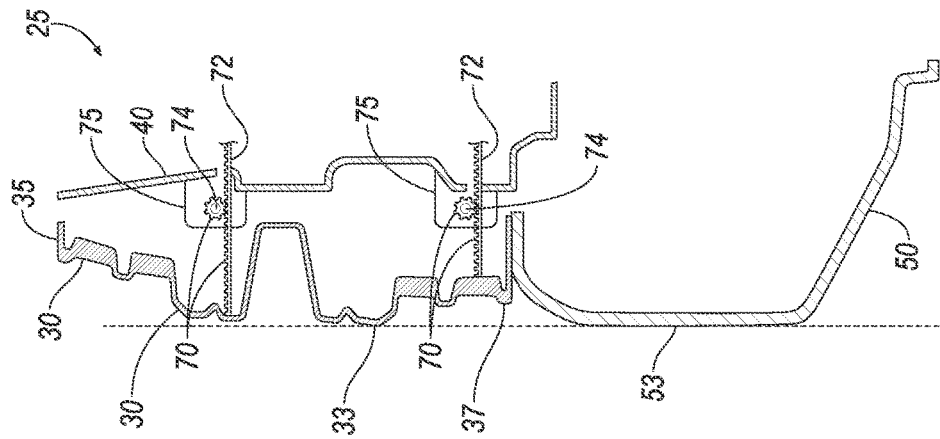
FIG. 6 illustrates a cross-sectional view of the movable grille of FIG. 5 in an extended position.
Figure 5:
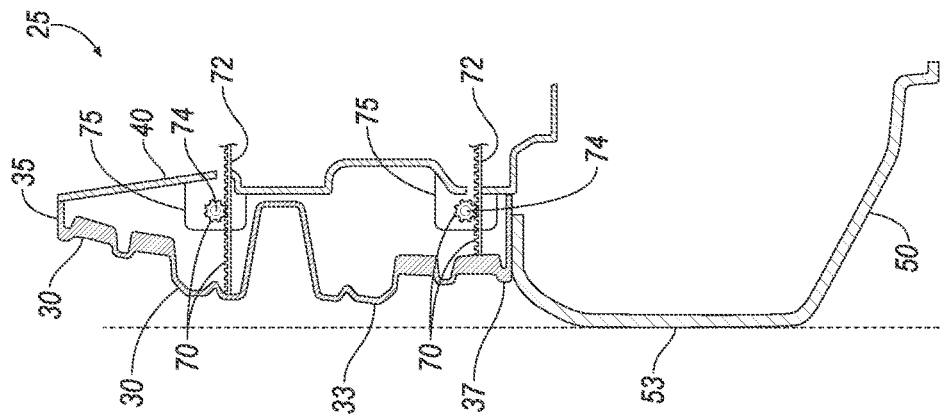
FIG. 5 illustrates a cross-sectional view of an embodiment of a movable grille in a retracted position.

As shown in FIGS. 5-6, the grille 30 may translate between the extended position and the retracted position. Translation is a movement that changes the position of grille 30, i.e. movement of every point of the grille 30 by the generally the same amount in a given direction. For example, every point of the grille 30 may move in a forward direction by the same amount of distance when the grille 30 transitions from the retracted position to the extended position.

Translation may be provided by a pair of linear actuators 70 disposed between, and connected to, the base 40 and the grille 30. A first linear actuator 70 may be located proximate the top end 35 of the grille 30, i.e. closer to the top end 35 than the bottom end 37. A second linear actuator 70 may be located proximate the bottom end 37 of the grille 30, i.e. closer to the bottom end 37 than the top end 35. Movement of the first and second linear actuators 70 by generally the same distance causes the grille 30 to translate.

Figure 8:
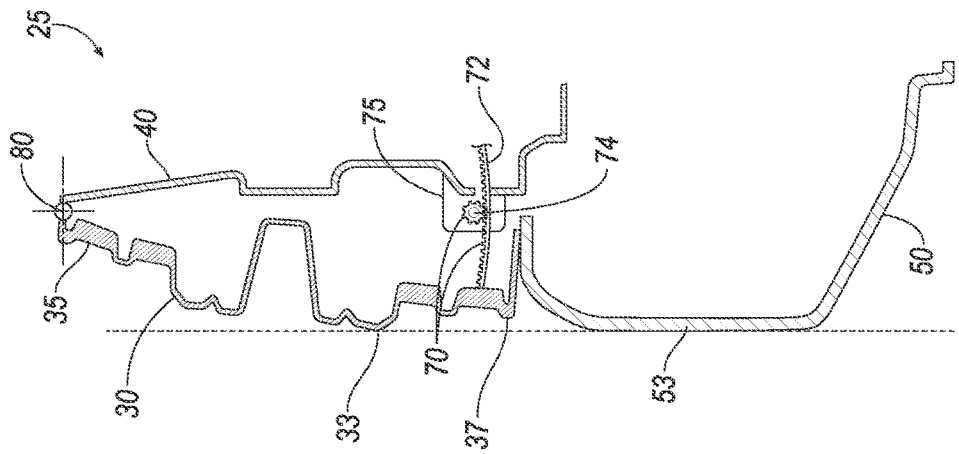
FIG. 8 illustrates a cross-sectional view of the movable grille of FIG. 7 in an extended position.
Figure 7:
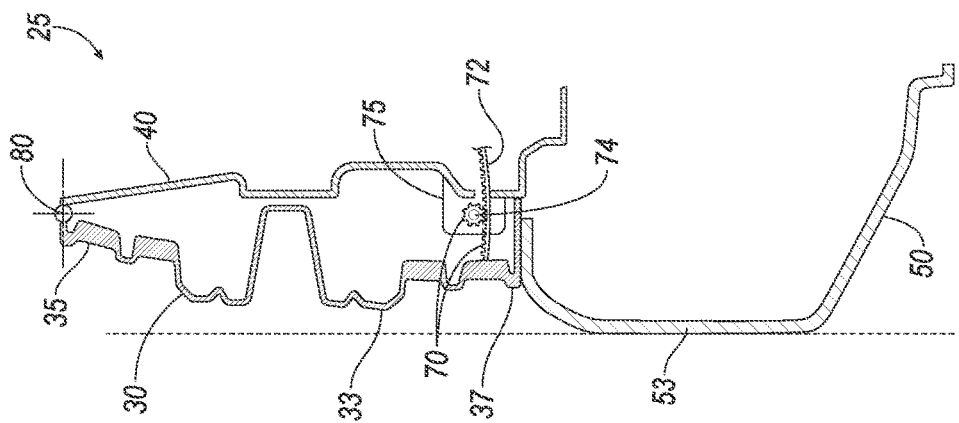
FIG. 7 illustrates a cross-sectional view of another embodiment of a movable grille in a retracted position.

As shown in FIGS. 7-8 the grille 30 may rotate between the extended position and the retracted position. Rotation is a circular movement of the grille 30 about a point of rotation. For example, the point of rotation may be provided by the hinge 80 disposed at the top end 35 of the grille 30, the hinge 80 connecting the grille 30 to the base 40. The hinge 80 may have a first hinge portion fixed relative to the grille 30, a second hinge portion fixed relative to the base 40, and a pin connecting the first hinge portion and the second hinge portion. The pin may allow rotational motion of the second hinge portion relative to the first hinge portion. Movement of the grille 30 about the hinge 80 may be provided by the linear actuator 70 disposed between, and supported by, the grille 30 and the base 40 at a distance away from the point of rotation of the hinge 80. For example, the linear actuator 70 may be located proximate the bottom end 37 of the grille 30. In further example, the linear actuator 70 may be located between the hinge 80 and the bumper 50.

Figure 10:
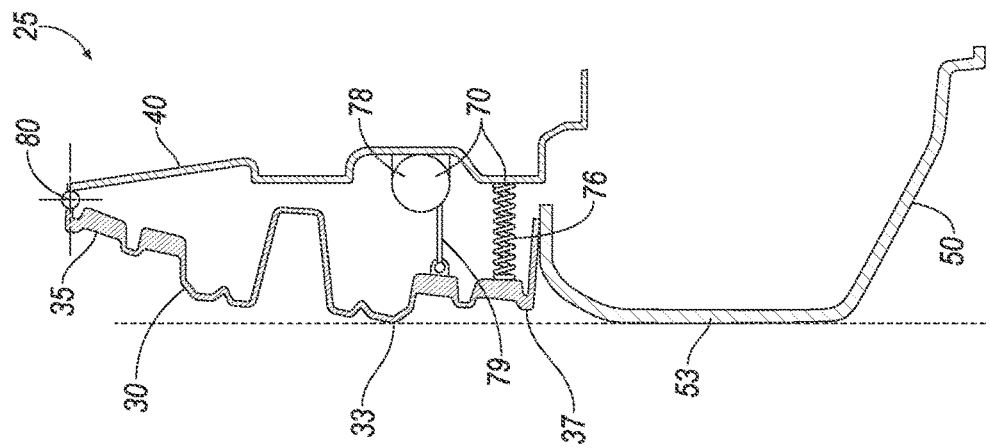
FIG. 10 illustrates a cross-sectional view of another embodiment of a movable grille in an extended position.
Figure 9:
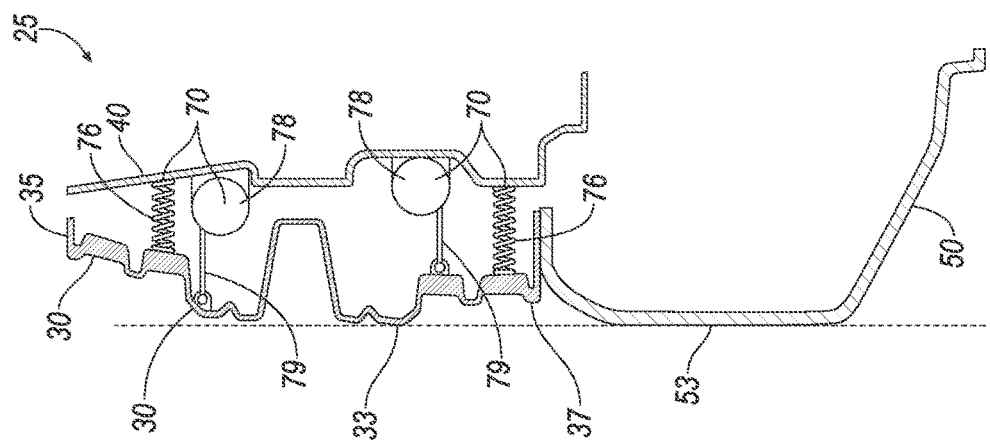
FIG. 9 illustrates a cross-sectional view of another embodiment of a movable grille in an extended position.

With reference to FIGS. 9-10, the linear actuator 70 may include a spring 76 and a cable retractor 78. When the spring 76 is compressed, the spring 76 exerts a force opposite to the direction of compression. The spring 76 may be a helical or coiled shape, and may be made out of spring steel. The spring 76 may be disposed between, and connected to, the grille 30 and the base 40 in a compressed state such that the spring 76 is continuously urging the grille 30 toward the extended position.

The cable retractor 78 controls an amount of cable 79 extended and retracted from the cable retractor 78. For example, the cable retractor 78 may store cable 79 on a spool where rotation of the spool in one direction causes cable 79 to extend, or reel out, from the cable retractor 78, while rotation of the spool in an opposite direction causes cable 79 to retract, or reel in, to the cable retractor 78. Rotation of the spool may be provided by an electric motor, or other rotation generating device, in communication with the computer 60, such as by being connected to the vehicle communication bus or network 22. The cable retractor 78 may be supported by the base 40 with the cable 79 secured to the grille 30. Retraction of the cable 79 into the cable retractor 78 causes the spring 76 to compress, and moves the grille 30 toward the retracted position. Extension of the cable 79 out of the cable retractor 78 allows the spring 76 to expand, and moves the grille 30 towards the extended position.

The assembly 25 may include a plurality of linear actuators 70. For example, in FIGS. 5 and 6, the assembly may include two racks/pinions/motors. A first and second motor 75 may be support by the base 40, with the motor 75 proximate the top end 35 of the grille 30 away from the bumper 50, and the second motor 75 proximate the bottom end 37 of the grille near the bumper 50. Pinions 74 may be supported on the motors 75. Additionally, first and second racks 72 may extend from the grille 30 in a location that allows the racks 72 to mesh with the pinions 74. As another example springs 76 and cable retractors 78 may be used. For example, as shown in FIG. 9, a first and second spring 76 may be disposed between the grille 30 and the base 40, with the first spring 76 at the top end 35 of the grille 30 away from the bumper 50, and the second spring 76 at the bottom end 37 of the grille near the bumper 50. Additionally, first and second cable retractors 78 having retractable cables 79 may be supported by the base 40, with the first cable retractors 78 supported by the base 40 at the top end 35 of the grille 30 away from the bumper 50 and the second cable retractor 78 supported in the base 40 at the bottom end of 37 the grille 30 near the bumper 50.

Figure 12:
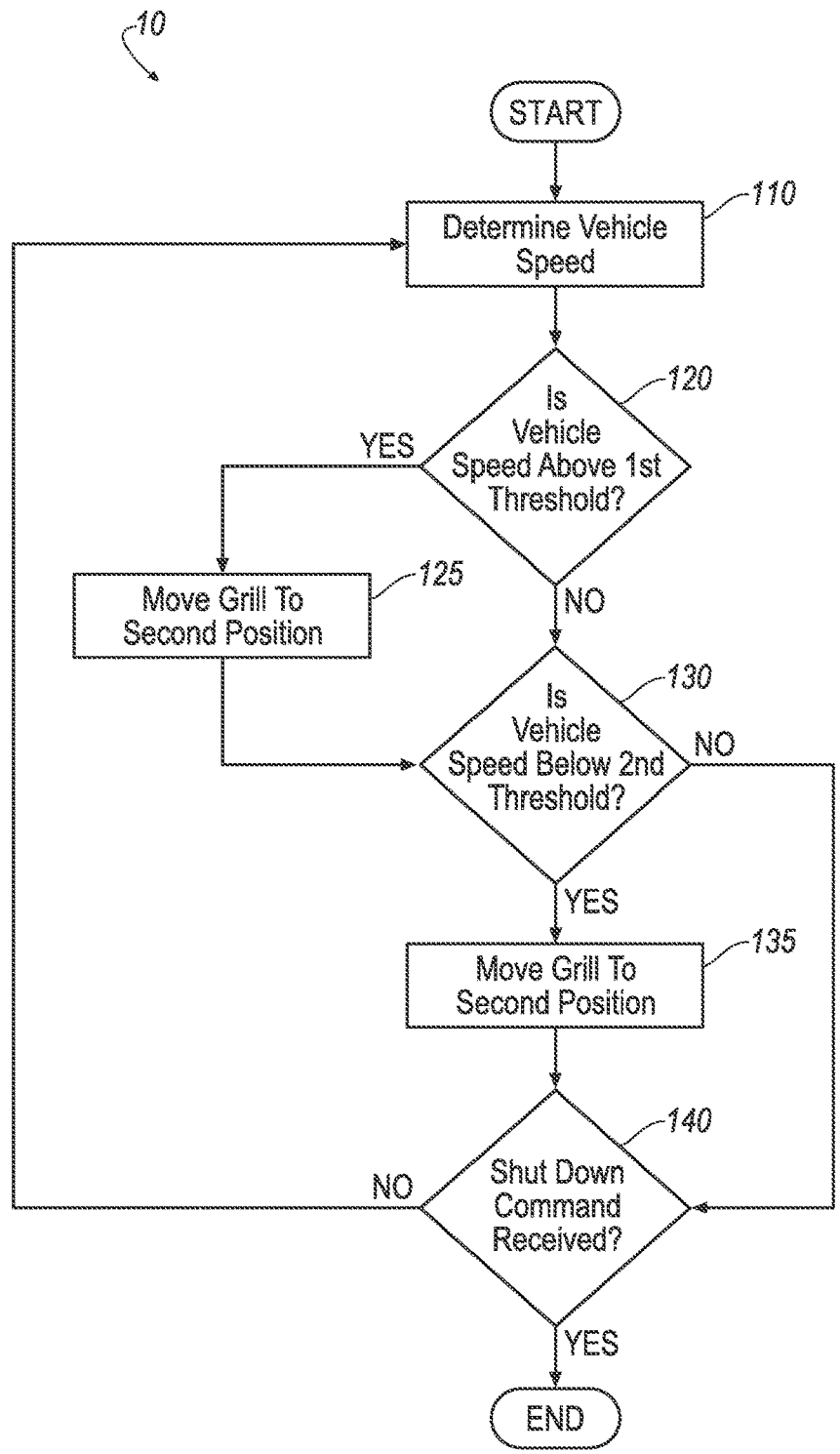
FIG. 12 illustrates a flow chart of an example process for controlling a movable grille.

Referring to FIG. 12, a process 100 for controlling the movement of the grille 30 may begin when the vehicle 20 is powered on, put in gear, or is otherwise placed in a ready condition to operate.

Next, at a block 110 the computer 60 determines a speed of the vehicle 20. The computer 60 may determine the speed of the vehicle 20 based at least on information received from the sensors 65. For example, the computer 60 may receive information from a speed sensor detecting a rotational speed of a wheel of the vehicle 20. Additionally, or alternatively, the computer 60 may receive information from a speed sensor detecting a rotational speed of a powertrain component, such as an axle shaft. The detected rotation(s) may be compared by the computer 60 to a lookup table stored on the memory 64, where the lookup table contains rotational speeds and correlated vehicle speeds.

After the computer 60 determines the speed of the vehicle 20, the computer 60 moves to a block 120 and determines if the vehicle speed is above a first threshold, e.g. 5 miles per hour. The first threshold may be as low as 0 miles per hour. Upon a determination that the speed of the vehicle 20 is above the first threshold, the computer 60 moves to a block 125. Else, the computer 60 moves to a block 130.

At the block 125, the computer 60 causes the grille 30 to move to the extended position. For example, the computer 60 may actuate the linear actuator 70, such as the rack 72 and pinion 74 or the cable retractor 78, to move the grille 30. When the grille 30 is in the extended position and the linear actuator 70 receives a command to move the grille 30 to the extended position, the linear actuator 70 maintains the grille 30 in the extended position.

At the block 130 the computer 60 determines if the speed of the vehicle is equal to and/or below a second threshold, e.g. 1 mile per hour. The second threshold may be equal to the first threshold, and may be as low as 0 miles per hour.

Upon determination that the speed of the vehicle is equal to and/or below the second threshold, the computer 60 moves to a block 135. Else, the computer 30 moves to a block 110.

At the block 135 the computer 60 causes the grille 30 to move to the retracted position. For example, the computer 60 may actuate the linear actuator 70, such as the rack 72 and pinion 74 or the cable retractor 78, to move the grille 30. When the grille 30 is in the retracted position and the linear actuator 70 receives a command to move the grille 30 to the retracted position, the linear actuator 70 maintains the grille 30 in the retracted position.

At the block 140 the computer 60 determines if it has received a shutdown command. The shutdown command may be received from a user input through an HMI, such as the user turning a key, pressing a stop/stop button, placing the vehicle 20 in park, etc. The shutdown command may be self-generated by the computer 60, such as being based on a detection that a key fob is out of range of the vehicle, or as part of a parking process of an autonomous vehicle.

Upon determination that the shutdown command has been received, the process 100 ends. Else, the computer 60 returns to the block 140.

Computing devices as discussed herein generally each include instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computing device is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

As used herein, the adverb "generally" modifying an adjective means that a shape, structure, measurement, value, calculation, etc. may deviate from an exact described geometry, distance, measurement, value, calculation, etc., because of imperfections in materials, machining, manufacturing, measurements, etc.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:

1. A vehicle comprising:
    a base;
    a grille supported by the base, and movable between a retracted position and an extended position;
    a bumper supported by the base; and
    a first linear actuator and a second linear actuator connected to the grille and the base, the second linear actuator between the first linear actuator and the bumper;
    wherein in the retracted position the grille is offset from a front terminal portion of the bumper, and in the extended position the grille is generally aligned with the front terminal portion of the bumper.

2. The vehicle of claim 1, wherein:
    the first linear actuator includes a spring disposed between the grille and the base, the spring biasing the grille away from the base toward the extended position.

3. The vehicle of claim 2, wherein:
    the first linear actuator includes a cable retractor and a retractable cable extendable and retractable from the cable retractor, the cable retractor supported by the base, and the retractable cable secured to the grille.

4. The vehicle of claim 3, wherein the spring is between the cable retractor and the bumper.

5. The vehicle of claim 1 further comprising
    a computer comprising program instructions to:
    move the grille to the extended position when the vehicle is traveling above a threshold speed.

6. The vehicle of claim 1, wherein the grille rotates between the retracted position and the extended position.

7. The vehicle of claim 1, wherein the grille translates between the retracted position and the extended position.

8. The vehicle of claim 1 wherein the first linear actuator includes a rack and a pinion gear meshing with the rack.

9. The vehicle of claim 1, wherein:
    the first linear actuator includes a first spring disposed between the grille and the base biasing the grille away from the base toward the extended position;
    the first linear actuator includes a first cable retractor and a first cable extendable and retractable from the first cable retractor, the first cable retractor supported by the base and the retractable cable secured to the grille in a position to compress the first spring;
    the second linear actuator includes a second spring disposed between the grille and the base biasing the grille away from the base toward the extended position; and
    the second linear actuator includes a second cable retractor and a second cable extendable and retractable from the second cable retractor, the second cable retractor supported by the base and the second retractable cable secured to the grille in a position to compress the second spring.

10. The vehicle of claim 9, wherein the first spring is between the first cable retractor and the bumper, and the second cable retractor is between the second spring and the bumper.

11. The vehicle of claim 1, further comprising a computer comprising program instructions to:
    determine a speed of the vehicle; and
    move the grille from the retracted position to the extended position when the speed of the vehicle is above a threshold speed.

12. The vehicle of claim 11, wherein the computer actuates the first linear actuator and the second linear actuator to move the grille between the retracted position and the extended position.

13. The vehicle of claim 11, wherein the computer actuates a retractable cable to move the grille between the retracted position and the extended position.

14. The vehicle of claim 11, further comprising program instructions to:
    move the grille from the extended position to the retracted position when the vehicle speed is below a second threshold speed different than the threshold speed.

15. The vehicle of claim 11, wherein the computer actuates a retractable cable to move the grille from the extended position to the retracted position.

16. An assembly comprising:
    a base;
    a grille supported by the base, and movable between a retracted position and an extended position;
    a cable retractor supported by the base and a cable extending in a vehicle-forward direction from the cable retractor to the grille; and
    a spring spaced from the cable and the cable retractor, the spring extending from the base to the grille.

17. The assembly of claim 16 further comprising:
    the grille pivotally attached to the base with a hinge, the hinge located at a first end of the grille and the spring located proximate an opposing second end of the grille.

18. The assembly of claim 16, further comprising a second spring spaced from the cable and the cable retractor, the second spring extending from the base to the grille, and wherein the cable is between the spring and the second spring.

19. The assembly of claim 18, further comprising a second cable retractor supported by the base and a second cable extending in a vehicle-forward direction from the second cable retractor to the grille between the second spring and the cable.

20. The assembly of claim 16, wherein the cable is spaced from the spring in a vertical direction.

* * * * *